(12) United States Patent
Imanishi et al.

(10) Patent No.: US 8,338,056 B2
(45) Date of Patent: Dec. 25, 2012

(54) TUBULAR FUEL CELL

(75) Inventors: Masahiro Imanishi, Susono (JP);
Haruyuki Nakanishi, Susono (JP);
Shigeaki Murata, Numazu (JP);
Hirokazu Ishimaru, Toyota (JP);
Yuichiro Hama, Nagoya (JP); Yoshihisa Tamura, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 904 days.

(21) Appl. No.: 12/084,820

(22) PCT Filed: Nov. 9, 2006

(86) PCT No.: PCT/IB2006/003160
§ 371 (c)(1),
(2), (4) Date: May 9, 2008

(87) PCT Pub. No.: WO2007/054795
PCT Pub. Date: May 18, 2007

(65) Prior Publication Data
US 2009/0155659 A1    Jun. 18, 2009

(30) Foreign Application Priority Data

Nov. 10, 2005  (JP) ................................. 2005-326728

(51) Int. Cl.
*H01M 2/08* (2006.01)
*H01M 2/14* (2006.01)
(52) U.S. Cl. ......... 429/508; 429/507; 429/509; 429/510
(58) Field of Classification Search .................... 429/32, 429/115, 460, 463, 469, 508
See application file for complete search history.

(56) References Cited

U.S. PATENT DOCUMENTS

| | | | | |
|---|---|---|---|---|
| 3,124,487 | A * | 3/1964 | Duddy et al. | 429/499 |
| 5,372,895 | A * | 12/1994 | Sato et al. | 429/481 |
| 6,495,281 | B1 * | 12/2002 | Eshraghi | 429/452 |
| 2002/0177028 | A1 * | 11/2002 | Suzuki et al. | 429/34 |
| 2002/0197520 | A1 | 12/2002 | Quick et al. | |
| 2004/0023101 | A1 | 2/2004 | Jacobson et al. | |

(Continued)

FOREIGN PATENT DOCUMENTS

CA    2 486 370 A1    4/2003

(Continued)

OTHER PUBLICATIONS

Office Action dated Sep. 27, 2011 of Japanese Application No. 2005-326728 and English translaton thereof.

*Primary Examiner* — Barbara Gilliam
*Assistant Examiner* — Jennifer Rea
(74) *Attorney, Agent, or Firm* — Kenyon & Kenyon LLP

(57) ABSTRACT

A tubular fuel cell includes an inner current collector, a membrane-electrode assembly, and seal portions provided at the axial end portions of the membrane-electrode assembly, respectively. The membrane-electrode assembly includes an inner catalyst layer provided on the inner current collector, an electrolyte membrane provided on the inner catalyst layer, and an outer catalyst layer provided on the electrolyte membrane. The axial length of the outer catalyst layer is shorter than the axial lengths of the electrolyte membrane and the outer catalyst layer. The axial end face of the outer catalyst layer and the axial end face of the inner catalyst layer are located on the opposite sides of the seal portion in each side of the tubular fuel cell.

4 Claims, 3 Drawing Sheets

U.S. PATENT DOCUMENTS

2004/0096718 A1* 5/2004 Gomez .................. 429/30
2005/0196657 A1* 9/2005 Sarkar et al. ............. 429/31

FOREIGN PATENT DOCUMENTS

| | | | |
|---|---|---|---|
| CN | 1653638 | A | 8/2005 |
| JP | 09-223507 | A | 8/1997 |
| JP | 11-204122 | A | 7/1999 |
| JP | 2001-229933 | A | 8/2001 |
| JP | 2003-068323 | A | 3/2003 |
| JP | 2003-297372 | A | 10/2003 |
| JP | 2004-505417 | A | 2/2004 |
| JP | 2005-235692 | A | 9/2005 |
| JP | 2005-353494 | A | 12/2005 |
| JP | 2006-216410 | A | 8/2006 |
| WO | WO 98/16963 | A | 4/1998 |
| WO | WO 02/09212 | A1 | 1/2002 |
| WO | 03/001624 | A2 | 1/2003 |
| WO | WO 03/041190 | A | 5/2003 |

* cited by examiner

TUBULAR FUEL CELL

This is a 371 national phase application of PCT/IB2006/003160 filed 9 Nov. 2006, claiming priority to Japanese Patent Application No. 2005-326728 filed 10 Nov. 2005, the contents of which are incorporated herein by reference.

FIELD OF THE INVENTION

The invention relates to a tubular fuel cell, more specifically, to a tubular fuel cell with improved power generation performance.

BACKGROUND OF THE INVENTION

Researches have continuously been conducted on tubular fuel cells (will be referred to as a "tubular PEFCs" where appropriate) for the purpose of increasing the power density per unit area of a tubular fuel cell above a certain level. Typically, a unit cell of a tubular PEFC (hereinafter will referred to as "tubular cell" where appropriate) includes a membrane-electrode assembly (hereinafter, referred to as "MEA") having an electrolyte membrane formed into a hollow shape and catalyst layers provided on the inner and outer sides of the electrolyte membrane. In the unit cell, electric reactions occur, for example, when hydrogen gas (will be simply referred to as "hydrogen") is supplied to the inner side of the MEA and oxygen gas (will be simply referred to as "oxygen") is supplied to the outer side of the MEA, and the electricity generated through the electric reactions is collected via current collectors provided on the inner and outer sides of the MEA, respectively, and then output to the outside. Note that the current collector provided on the inner side of the MEA will be referred to as "inner current collector", and the current collector provided on the outer side of the MEA will be referred to as "outer current collector". That is, in a tubular PEFC, power generation is performed by supplying one reaction gas (e.g., hydrogen) to the inner side of the MEA and another reaction gas (e.g., oxygen) to the outer side. In a tubular PEFC, therefore, the outer surfaces of two or more adjacent unit cells are exposed to a reaction gas supplied to a common space, and therefore there is no need to provide separators, which also serve as gas shields, between the unit cells, unlike the case of flat type PEFCs. Accordingly, a tubular PEFC can be made compact in size.

As one example of a technology related to a tubular fuel cell, Published Japanese Translation of PCT Application No. 2004-505417 describes a fuel cell in which all components of a micro cell are fabricated in a single fiber assembly. This structure, according to the related descriptions in this reference, enables power generation to be performed at a high power density and allows the size of the electrochemical cell block (i.e., tubular cells) to be minimized.

As described above, in a tubular PEFC, electricity is produced using hydrogen and air. In order to prevent theses gases from being mixed with each other, seal portions are provided at the end portions of each tubular cell. For example, in a tubular PEFC as described in Published Japanese Translation of PCT Application No. 2004-505417, referring to FIG. 3, an MEA 96 including an inner catalyst layer 92, an electrolyte membrane 91, and an outer catalyst layer 92b is provided around an inner current collector 5, and an outer current collector (not shown) is arranged so as to be in contact with the outer catalyst layer 92b, and seal portions 971, 972 are provided at the end portions of the MEA 96, respectively. In this tubular PEFC, however, one reaction gas (hydrogen in FIG. 3) is supplied to the surface and end face of each end portion of the outer catalyst layer 92b and the other reaction gas (oxygen in FIG. 3) is supplied to the surface of the middle portion of the outer catalyst layer 92b. Therefore, when hydrogen and oxygen are supplied to different portions of the outer catalyst layer 92b, power generation occurs at some portions of the outer catalyst layer 92b, and it may reduce the power generation performance of the tubular PEFC, which is a problem.

DISCLOSURE OF THE INVENTION

It is an object of the invention to provide a tubular fuel cell having improved power generation performance.

A first aspect of the invention relates to a tubular fuel cell including an inner current collector, a membrane-electrode assembly (MEA), and seal portions provided at axial end portions of the MEA, respectively, the MEA including an inner catalyst layer provided on the inner current collector, an electrolyte membrane provided on the inner catalyst layer, and an outer catalyst layer provided on the electrolyte membrane. In this tubular fuel cell, the axial length of the outer catalyst layer is shorter than the axial length of the electrolyte membrane and the axial length of the inner catalyst layer. When the axial end faces of the inner catalyst layer are denoted axial end faces A1, A2, respectively, an axial end face of the electrolyte membrane corresponding to the axial end face A1 is denoted an axial end face B1, an axial end face of the electrolyte membrane corresponding to the axial end face A2 is denoted an axial end face B2, an axial end face of the outer catalyst layer corresponding to the axial end faces A1, B1 is denoted an axial end face C1, and an axial end face of the outer catalyst layer corresponding to the axial end faces A2, B2 is denoted an axial end face C2, the axial end face C1 is closer to the axial center of the tubular fuel cell than the axial end faces A1, B1 are, the axial end face C2 is closer to the axial center of the tubular fuel cell than the axial end faces A2, B2 are, and one of the seal portions is disposed between where the axial end faces A1, B1 are located and where the axial end face C1 is located, and the other of the seal portions is disposed between where the axial end faces A2, B2 are located and where the axial end face C2 is located.

In the invention, "axial end portions" of the MEA refer to the end portions of the MEA in the axial direction of the tubular fuel cell, and the description "one axial end portion corresponding to another axial end portion" means that the two axial end portions are located on the same side of the axial center of the MEA. In the invention, the seal portions may be made of, for example, a thermosetting resin (e.g. epoxy) or a two-component adhesive that sets by two components being mixed with each other (e.g. heat-resistant epoxy-based adhesive). Also, the description "one of the seal portions is disposed (or located) between where the axial end faces A1, B1 are located and where the axial end face C1 is located, and the other of the seal portions is disposed (or located) between where the axial end faces A2, B2 are located and where the axial end face C2 is located" also encompasses a structure where at least one of C1 and C2 is within the seal portion, in other words, a structure where at least one of the seal portions is disposed so as to cover C1 or C2.

A second aspect of the invention relates to a tubular fuel cell including an inner current collector, an MEA, and seal portions provided at axial end portions of the MEA, respectively. The MEA includes an inner catalyst layer provided on the inner current collector, an electrolyte membrane provided on the inner catalyst layer, and an outer catalyst layer provided on the electrolyte membrane. When the axial end faces of the inner catalyst layer are denoted axial end faces X1, X2, respectively, an axial end face of the electrolyte membrane corresponding to the axial end face Y1 is denoted an axial end face Y1, an axial end face of the electrolyte membrane corresponding to the axial end face X2 is denoted an axial end face Y2, an axial end face of the outer catalyst layer corresponding to the axial end faces X1, Y1 is denoted an axial end face Z1, and an axial end face of the outer catalyst layer corresponding to the axial end faces X2, Y2 is denoted an axial end face Z2, the axial end faces X1, Y1, and Z1 are located within one of the seal portions and the axial end faces X2, Y2, Z2 are located within the other of the seal portions, and the axial end faces X1, Y1, and Z1 are substantially aligned with each other, and the axial end faces X2, Y2, and Z2 are substantially aligned with each other.

In the first and second aspects of the invention, the inner current collector may be made of Cu, Au, or Pt.

According to the first aspect of the invention, the axial end face of the outer catalyst layer and the axial end face of the inner catalyst layer are located on the opposite sides of the seal portion in each side of the tubular fuel cell. According to this structure, it is possible to supply same reaction gas to the surfaces of the end portions and the middle portion of the outer catalyst layer, and thus to prevent undesired power generation which may otherwise occur at some portions of the outer catalyst layer. As such, a tubular fuel cell having improved power generation performance can be provided.

According to the second aspect of the invention, the axial end faces of the outer catalyst layer are located within the seal portions. According to this structure, too, it is possible to supply same reaction gas to the surfaces of the end portions and the middle portion of the outer catalyst layer, and thus to prevent undesired power generation which may otherwise occur at some portions of the outer catalyst layer. As such, a tubular fuel cell having improved power generation performance can be provided.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE EXEMPLARY EMBODIMENTS

Figure 1:
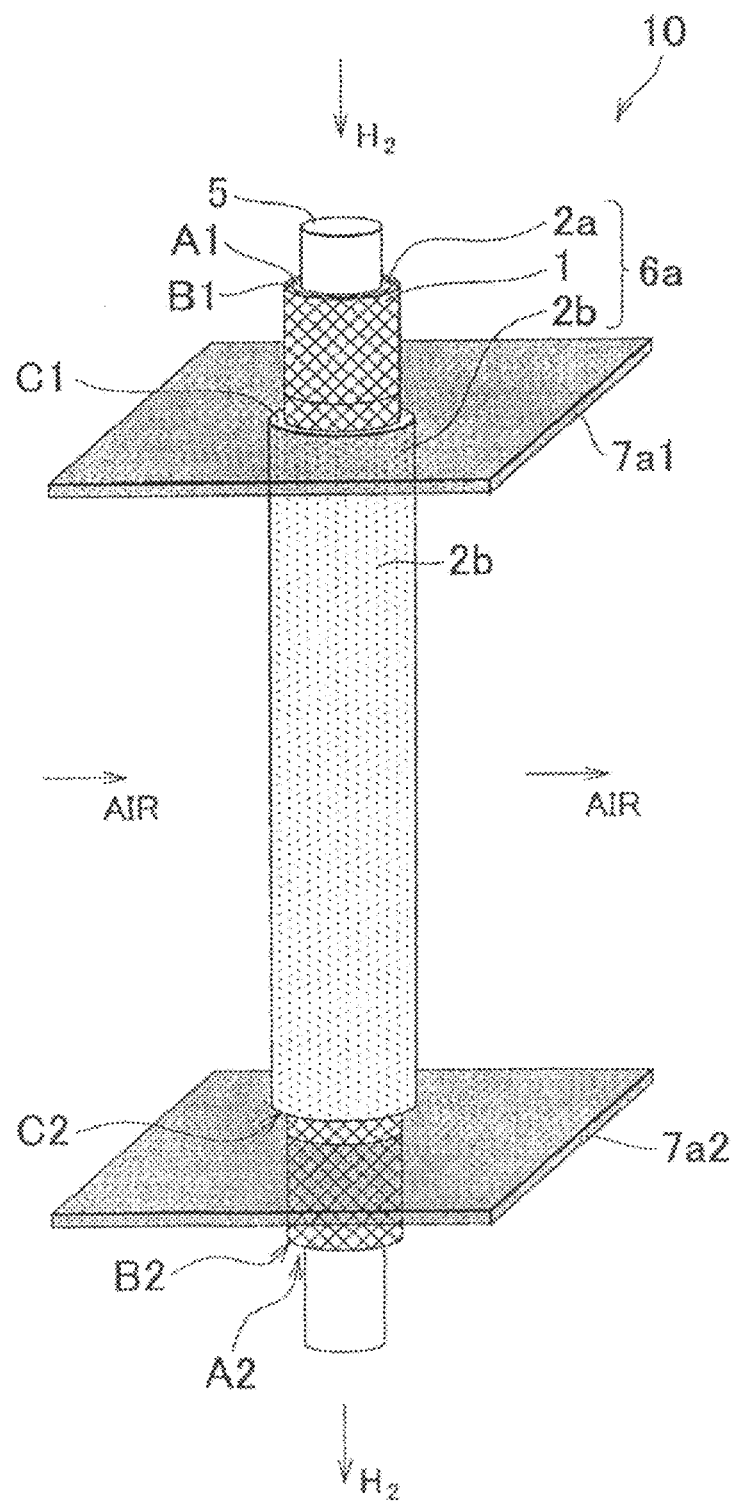
FIG. 1 is an enlarged perspective view showing a portion of a tubular fuel cell according to the first exemplary embodiment.

A tubular fuel cell according to the invention will be described in detail referring to the accompanying drawings. It is to be noted that the vertical direction in the drawings corresponds to "axial direction", the center of a tubular cell in the axial direction will be referred to as "axial center", and the ends of the tubular cell in the axial direction will be referred to as "axial ends".

FIG. 1 is an enlarged perspective view showing a portion of a tubular fuel cell according to the first exemplary embodiment of the invention. Referring to FIG. 1, a tubular fuel cell 10 includes an inner current collector 5, a membrane-electrode assembly (MEA) 6a, and seal portions 7a1, 7a2. The MEA 6a includes an inner catalyst layer 2a, an electrolyte membrane 1, and an outer catalyst layer 2b. The inner catalyst layer 2a is provided on the inner current collector 5, the electrolyte membrane 1 is provided on the inner catalyst layer 2a, and the outer catalyst later 2b is provided on the electrolyte membrane 1. The seal portions 7a1, 7a2 are provided at the axial end portions of the MEA 6a, respectively. In the inner current collector 5 are formed passages through which reaction gas diffuses between the inner current collector 5 and the inner catalyst layer 2a. An outer current collector is provided on the surface of the outer catalyst layer 2b. Note that the passages and the outer current collector are not shown in the drawings.

In the tubular fuel cell 10, the axial length of the outer catalyst layer 2b is shorter than the axial lengths of the inner catalyst layer 2a and the electrolyte membrane 1. An axial end face A1 of the inner catalyst layer 2a and an axial end face B1 of the electrolyte membrane 1 are located closer to one of the axial ends of the tubular fuel cell 10 than the seal portion 7a1 is, and an axial end face A2 of the inner catalyst layer 2a and an axial end face B2 of the electrolyte membrane 1 are located closer to the other of the axial ends of the tubular fuel cell 10 than the seal portion 7a2 is. Axial end faces C1, C2 of the outer catalyst layer 2b are located closer to the axial center of the tubular fuel cell 10 than the seal portions 7a1, 7a2 are. When hydrogen and air are supplied to the tubular fuel cell 10, air is supplied to the space between the seal portions 7a1, 7a2 and hydrogen is supplied to the space above and partitioned by the seal portion 7a1 and to the space below and partitioned by the seal portion 7a2, and therefore, only the air is supplied to the external catalyst layer 2b, thus preventing undesired power generation which may otherwise occur at some portions of the external catalyst layer 2b. As a result, the power generation performance of the tubular fuel cell 10 improves.

Further, in the tubular fuel cell 10 constructed as above, the seal portion 7a1 is disposed between where the axial end face C1 of the outer catalyst layer 2b is located and where the axial end faces A1 of the inner catalyst layer 2a and the axial end face B1 of the electrolyte membrane 1 are located, and the seal portion 7a2 is disposed between where the axial end face C2 of the outer catalyst layer 2b is located and where the axial end face A2 of the inner catalyst layer 2a and the axial end face B2 of the electrolyte membrane 1 are located. Therefore, when forming the seal portions 7a1, 7a2, the material of the seal portions 7a1, 7a2 is prevented from entering between the inner catalyst layer 2a and the electrolyte membrane 1 and between the electrolyte membrane 1 and the outer catalyst layer 2b. Note that the material of the seal portions 7a1, 7a2 may be, for example, a thermosetting resin (e.g. epoxy) or a two-component adhesive that sets by two components being mixed with each other (e.g. heat-resistant epoxy-based adhesive). That is, because the material of the seal portions 7a1, 7a2 is not present between the foregoing portions, conduction of protons is not interfered with, and therefore the power generation performance of the tubular fuel cell 10 improves.

The tubular fuel cell 10 is manufactured by, for example, the following processes. To begin with, the inner current collector 5 is produced from a material having good electric conductivity and corrosion resistance, which is, for example, Cu, Au, or Pt. Note that, when using Cu, it is preferable to coat the surface of the inner current collector 5 with a material having a high corrosion resistance, such as Ti, in order to enhance the corrosion resistance of the inner current collector 5. The inner catalyst layer 2a is formed on the surface of the inner current collector 5 by applying a catalyst ink onto the surface of the inner current collector 5 and then drying it. The catalyst ink is produced by, for example, adding catalyst, such as carbons carrying platinum, into a solution containing an ion exchange resin including fluorine, or the like, which has been liquefied using an organic solvent. After forming the inner catalyst layer 2a in this manner, the electrolyte membrane 1 is formed on the surface of the inner catalyst layer 2a by, for example, applying an ion exchange resin including fluorine, or the like, which has been liquefied using an organic solvent, to the surface of the inner catalyst layer 2a and then drying it. This ion exchange resin will hereinafter be referred to as "electrolyte composition" where appropriate. Subsequently, the outer catalyst layer 2b is formed on the surface of the electrolyte membrane 1 by, for example, applying the foregoing catalyst ink onto the surface of the electrolyte membrane 1. These processes are performed such that the axial end face C1 of the outer catalyst layer 2b is located at a different position from the axial end face B1 of the electrolyte membrane 1 and the axial end face C2 of the outer catalyst layer 2b is located at a different position from the axial end face B2 of the electrolyte membrane 1, as viewed in the axial direction. More specifically, as shown in FIG. 1, the outer catalyst layer is formed such that the axial end faces C1, C2 of the outer catalyst layer 2b are located closer to the axial center of the tubular cell than the axial end faces B1, B2 of the electrolyte membrane 1 are, respectively. Then, the outer current collector (not shown), which is made of the same material as the inner current collector 5, is formed on the outer catalyst layer 2b. After producing the tubular cell in this manner, the seal portion 7a1 is formed between the axial end face C1 of the outer catalyst layer 2b and the axial end face B1 of the electrolyte membrane 1, and the seal portion 7a2 is formed between the axial end face C2 of the outer catalyst layer 2b and the axial end face B2 of the electrolyte membrane 1. The seal portions 7a1, 7a2 are formed by, for example, applying a thermosetting resin (e.g. epoxy) which is in a liquid state at ambient temperatures or a two-component adhesive (e.g. heat-resistant epoxy-based adhesive) that sets by two components being mixed with each other, and then cooling it for solidification. This is how the tubular fuel cell 10 of the first exemplary embodiment can be manufactured.

Figure 2:
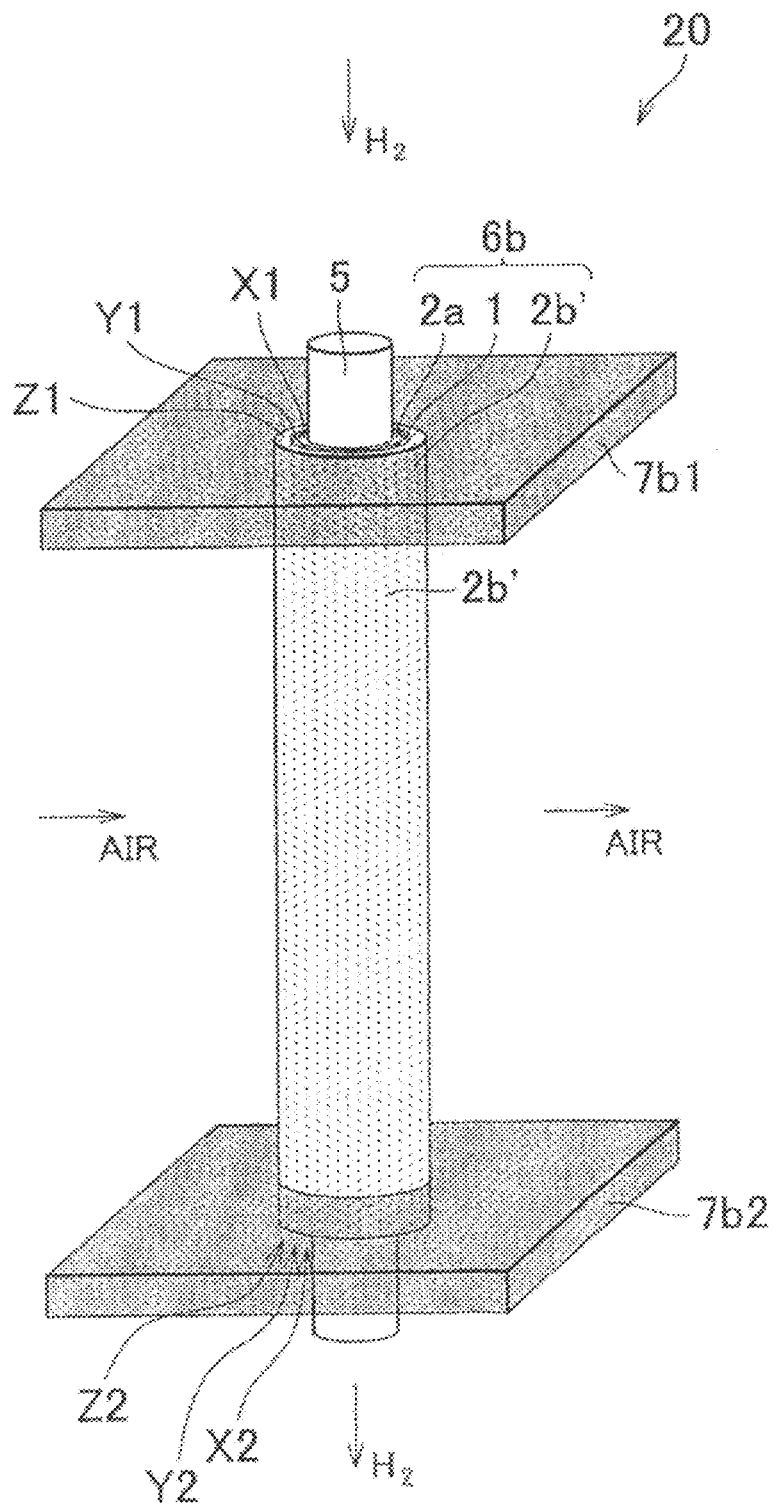
FIG. 2 is an enlarged perspective view showing a portion of a tubular fuel cell according to the second exemplary embodiment.
Figure 3:
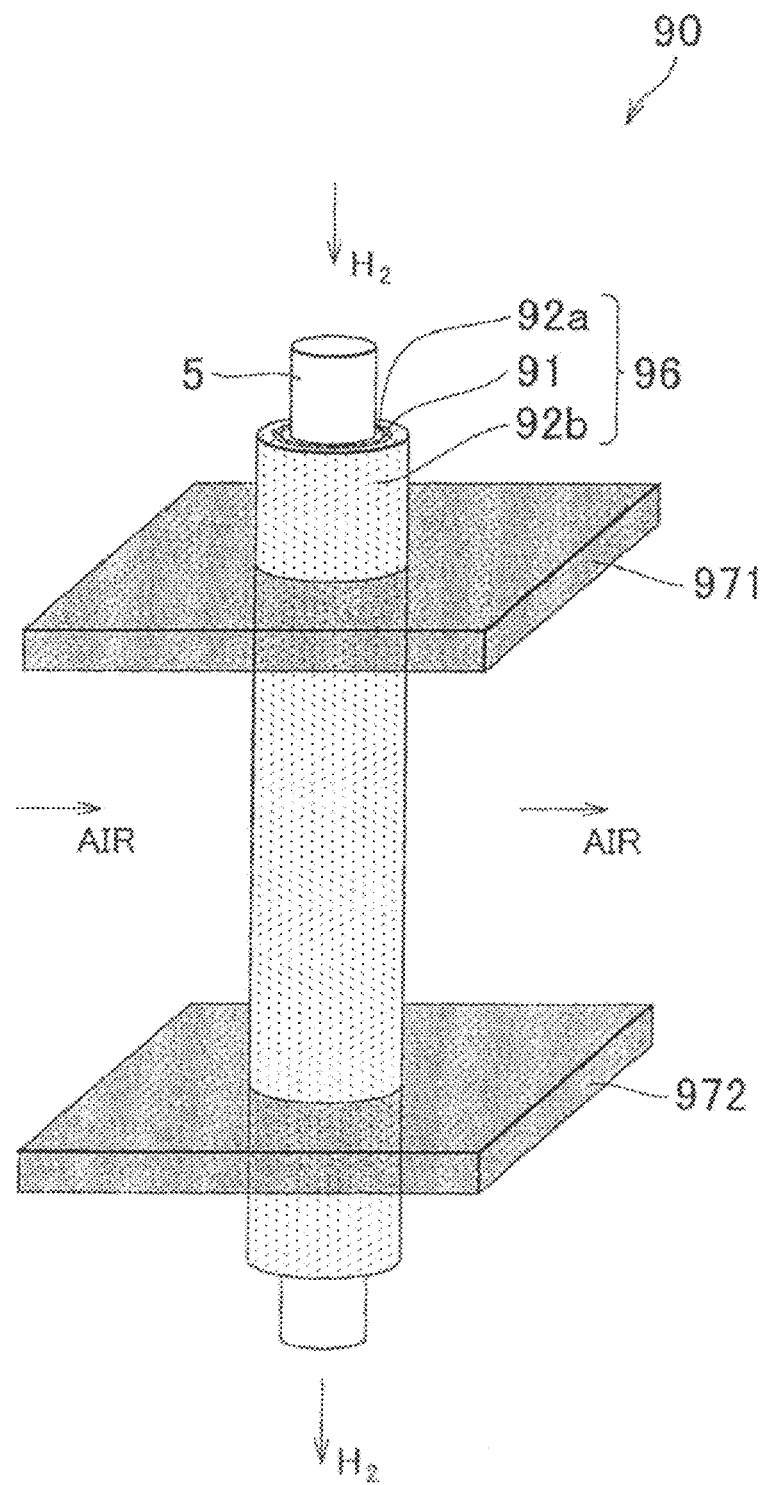
FIG. 3 is a perspective view showing the construction of a tubular fuel cell according to a related art.

FIG. 2 is an enlarged perspective view showing a portion of a tubular fuel cell 20 according to the second exemplary embodiment of the invention. In FIG. 2, the same reference numerals will be used to denote the portions and components having the same constructions as those in FIG. 1, and the description thereof will be omitted.

Referring to FIG. 2, a tubular fuel cell 20 includes an inner current collector 5, an MEA 6b, and seal portions 7b1, 7b2. The MEA 6b includes an inner catalyst layer 2a, an electrolyte membrane 1, and an outer catalyst layer 2b'. The inner catalyst layer 2a is provided on the inner current collector 5, the electrolyte membrane 1 is provided on the inner catalyst layer 2a, and the outer catalyst later 2b' is provided on the electrolyte membrane 1. The seal portions 7b1, 7b2 are provided at the axial end portions of the MEA 6b, respectively. In the inner current collector 5 are formed passages through which reaction gas diffuses between the inner current collector 5 and the inner catalyst layer 2a. An outer current collector is provided on the surface of the outer catalyst layer 2b'. Note that the passages and the outer current collector are not shown in the drawings. The thickness of each seal portion 7b1, 7b2 is larger than that of the seal portions 7a1, 7a2 in the first exemplary embodiment. The seal portions 7b1, 7b2 are made of, for example, a thermosetting resin (e.g. epoxy) or a two-component adhesive (e.g. heat-resistant epoxy-based adhesive) that sets by two components being mixed with each other.

On one side in the tubular fuel cell 20, an axial end face X1 of the inner catalyst layer 2a, an axial end face Y1 of the electrolyte membrane 1, and an axial end face Z1 of the outer catalyst layer 2b' are aligned with each other, and on the other side, an axial end face X2 of the inner catalyst layer 2a, an axial end face Y2 of the electrolyte membrane 1, and an axial end face Z2 of the outer catalyst layer 2b' are aligned with each other. The axial end faces X1, Y1, Z1 are arranged within the seal portion 7b1, and the axial end faces X2, Y2, Z2 are arranged within the seal portion 7b2. When hydrogen and air are supplied to the tubular fuel cell 20, air is supplied to the space between the seal portions 7b1, 7b2 and hydrogen is supplied to the space above and partitioned by the seal portion 7b1 and to the space below and partitioned by the seal portion 7b2, and therefore, only the air is supplied to the external catalyst layer 2b', thus preventing undesired power generation which may otherwise occur at some portions of the external catalyst layer 2b'. As a result, the power generation performance of the tubular fuel cell 20 improves.

The tubular fuel cell 20 is manufactured by, for example, the following processes. To begin with, the inner current collector 5 is produced from a material with good electric conductivity and corrosion resistance, which is, for example, Cu, Au, or Pt. Note that, when using Cu, it is preferable to coat the surface of the inner current collector 5 with a material having a high corrosion resistance, such as Ti, in order to enhance the corrosion resistance of the inner current collector 5. Then, the catalyst ink for forming the inner catalyst layer, the electrolyte composition, and the catalyst ink for forming the outer catalyst layer, which have all been liquefied by being heated, are extruded onto the surface of the inner current collector 5, respectively, to form the MEA 6b. After forming the MEA 6b, the seal portions 7b1, 7b2 are formed by applying a thermosetting resin (e.g. epoxy) which is in a liquid state at ambient temperatures or a two-component adhesive (e.g. heat-resistant epoxy-based adhesive) which sets by two components being mixed with each other, and then cooling it for solidification. The thermosetting resin or the two-component adhesive is applied to such positions that the resultant seal portions 7b1, 7b2 cover the respective axial end faces of the MEA 6b. This is how the tubular fuel cell 20 according to the second exemplary embodiment can be manufactured. According to the tubular fuel cell 20 of the second exemplary embodiment, tubular fuel cells can be manufactured by a simple manufacturing method. Note that, as an example of the method for extruding the catalyst ink for forming the inner catalyst layer, the electrolyte composition, and the catalyst ink for forming the outer catalyst layer, melt extrusion, which is typically used to manufacture electric wires or the like, may be used.

In the foregoing exemplary embodiments of the invention, air is supplied to the surface of the outer catalyst layer, and hydrogen is supplied into the inner catalyst layer via the axial end portions of the tubular cell. However, the invention is not limited to this, but it may alternatively be applied to, for example, a tubular fuel cell in which hydrogen is supplied to the surface of the outer catalyst layer and air is supplied into the inner catalyst layer.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A tubular fuel cell comprising:
an inner current collector;
a membrane-electrode assembly including (i) a tubular inner catalyst layer that is provided on the inner current collector and has a first axial end face and a second axial end face,
(ii) a tubular electrolyte membrane that is provided on the inner catalyst layer and has a third axial end face located on one side of an axial center of the tubular fuel cell where the first axial end face is located and a fourth axial end face located on the other side of the axial center of the tubular fuel cell where the second axial end face is located, and (iii) a tubular outer catalyst layer that is provided on the electrolyte membrane and has a shorter axial length than an axial length of the electrolyte membrane and an axial length of the inner catalyst layer, the outer catalyst layer having a fifth axial end face that is located on the one side of the axial center of the tubular fuel cell and is closer to the axial center of the tubular fuel cell than the first axial end face and the third axial end face are and a sixth axial end face that is located on the other side of the axial center of the tubular fuel cell and is closer to the axial center of the tubular fuel cell than the second axial end face and the fourth axial end face are;
a first seal portion that is provided at one of axial end portions of the membrane-electrode assembly so as to be located between where the first and third axial end faces are located and where the fifth axial end face is located; and
a second seal portion that is provided at the other of the end portions of the membrane-electrode assembly so as to be located between where the second and fourth axial end faces are located and where the sixth axial end face is located,
wherein the seal portions are disposed so as to physically contact the fifth axial end face and the sixth axial end face, respectively; and
wherein the seal portions do not contact the first axial end face, the second axial end face, the third axial end face, or the fourth axial end face.

2. The tubular fuel cell according to claim 1, wherein the inner current collector is made of Cu, Au, or Pt.

3. The tubular fuel cell according to claim 1, wherein the seal portions are made of a thermosetting resin.

4. The tubular fuel cell according to claim 1, wherein the seal portions are made of a two-component adhesive that sets by two components being mixed with each other.

* * * * *